United States Patent
Davis

[15] 3,656,378
[45] Apr. 18, 1972

[54] METHOD OF MANUFACTURE

[72] Inventor: Ariel R. Davis, P.O. Box 61, New Holland, Pa. 17557

[22] Filed: Dec. 17, 1970

[21] Appl. No.: 99,110

Related U.S. Application Data

[62] Division of Ser. No. 784,979, Nov. 12, 1968, abandoned.

[52] U.S. Cl.........................83/1, 29/2.25, 29/602, 83/36, 83/54
[51] Int. Cl..........................................B23d 45/00
[58] Field of Search...............83/1, 36, 49, 54; 29/2.21, 29/2.2, 2.25, 2.1, 602, 157.3, 173

[56] References Cited

UNITED STATES PATENTS 2,370,265  2/1945  Shoemaker..................29/2.2 X
3,466,743  9/1969  De Puy........................29/602

Primary Examiner—James M. Meister
Attorney—George C. Bower

[57] ABSTRACT

A tubular aluminum member is extruded in a rectangular shape and cut to a given length. The four walls of the tubular member are successively cut by a circular saw to form a portion of the tubular member into a generally spiral shape winding with terminal portions at each end. The member is treated to form an insulating layer on the surfaces of the member including the facing sides of the winding to form an inductive winding for passing current. The winding may be compressed and one set of edges treated for engagement by current taps to produce a variable voltage and current device.

10 Claims, 20 Drawing Figures

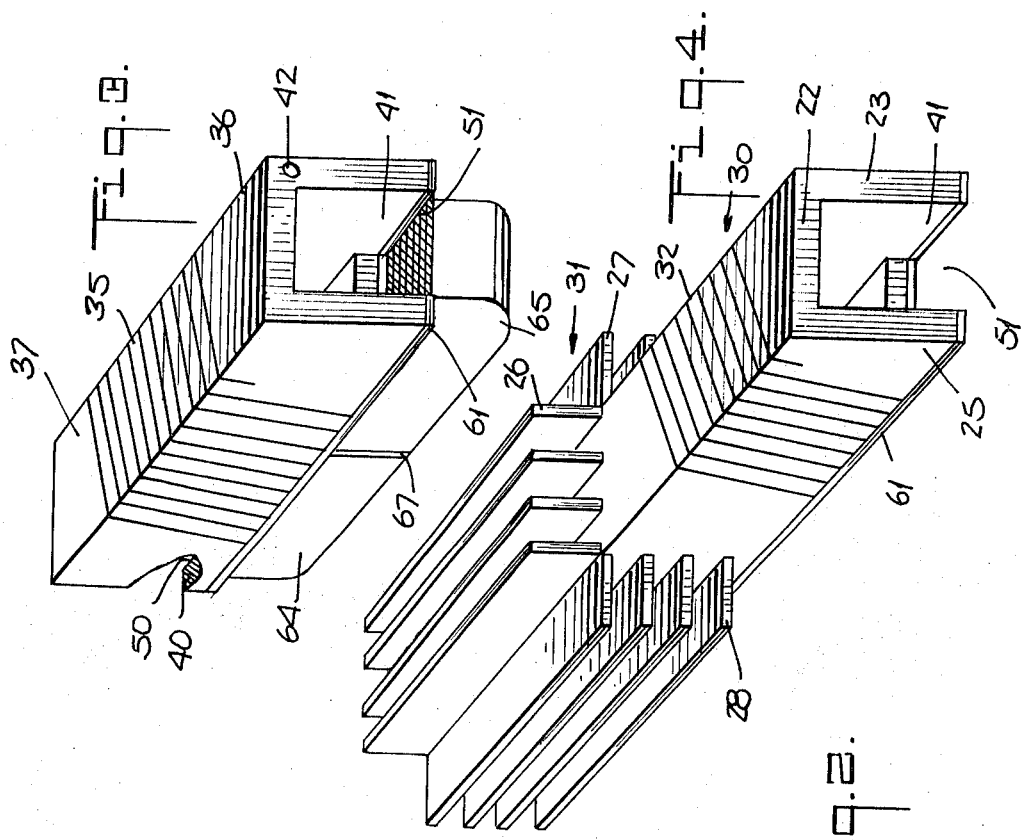
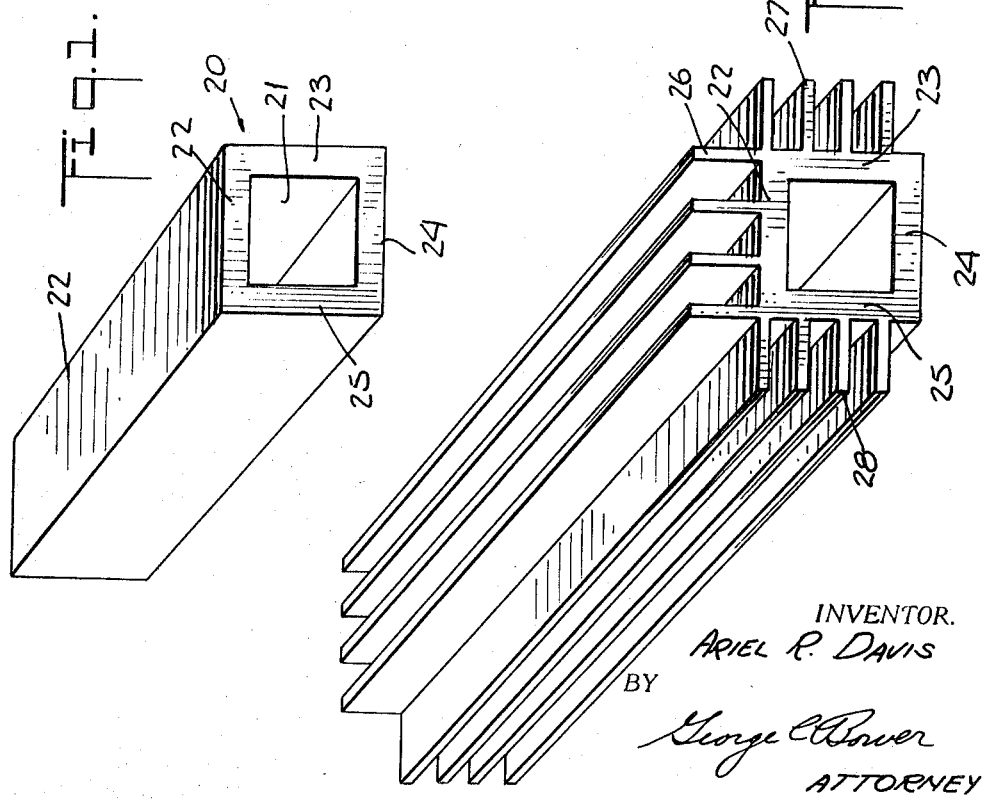

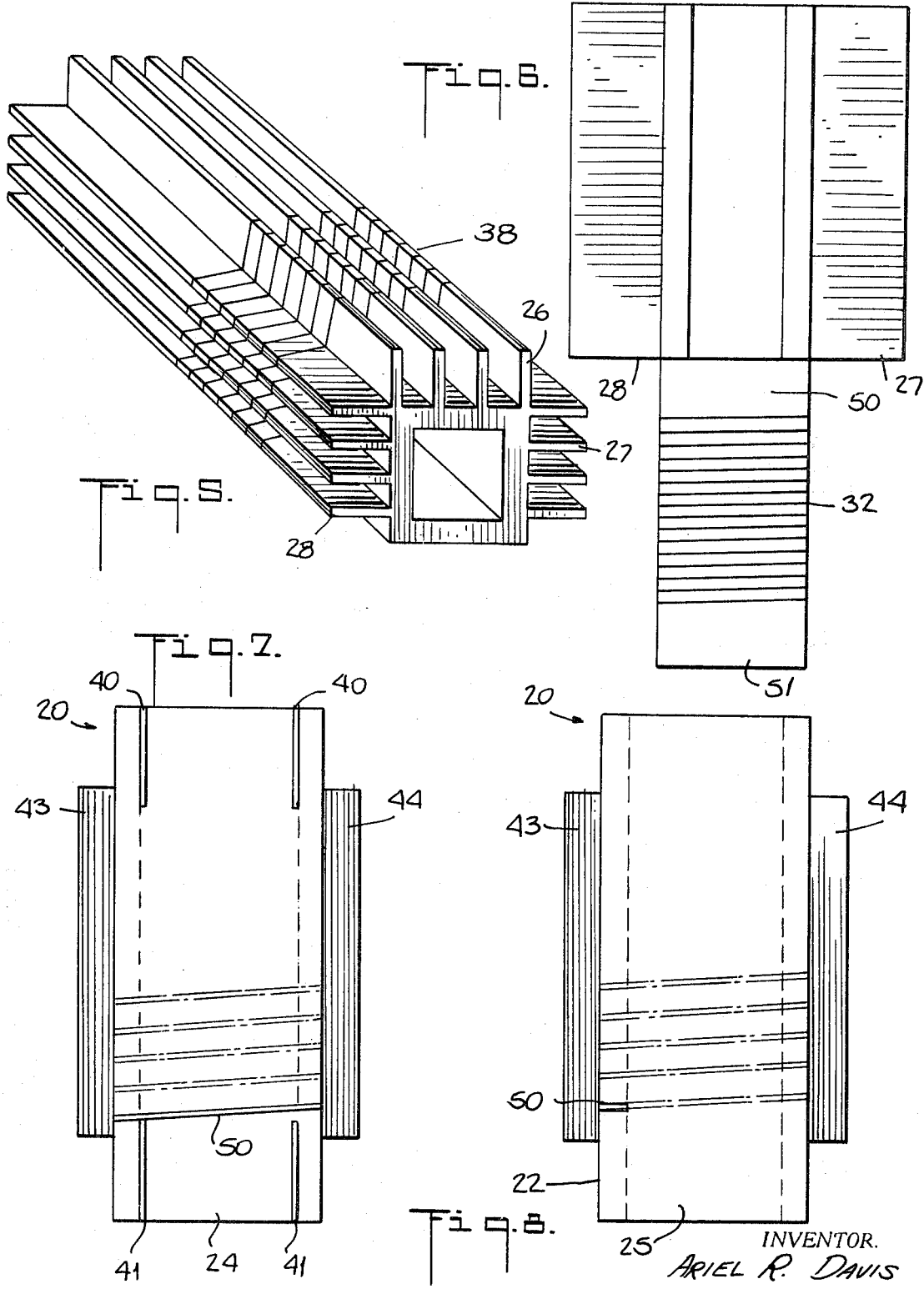

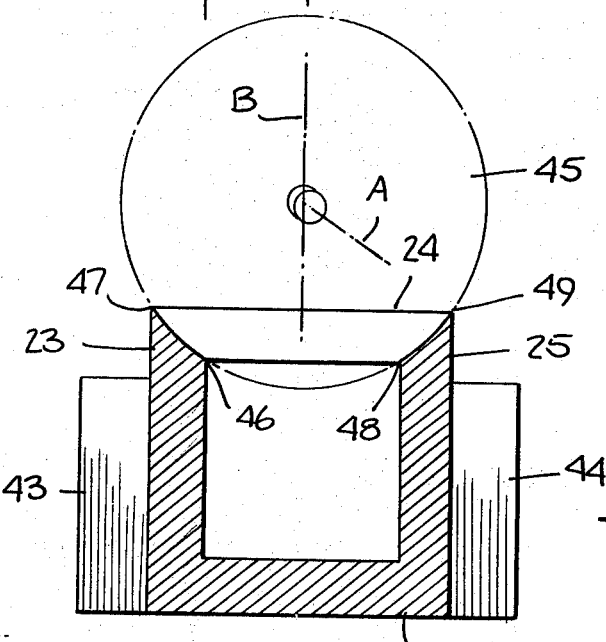
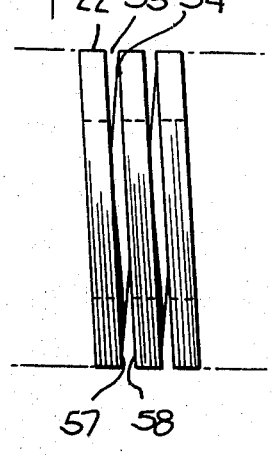
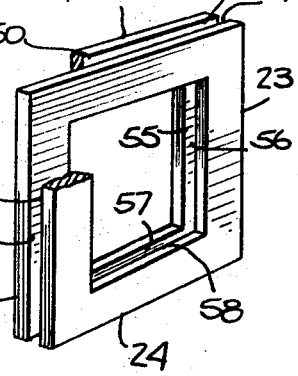
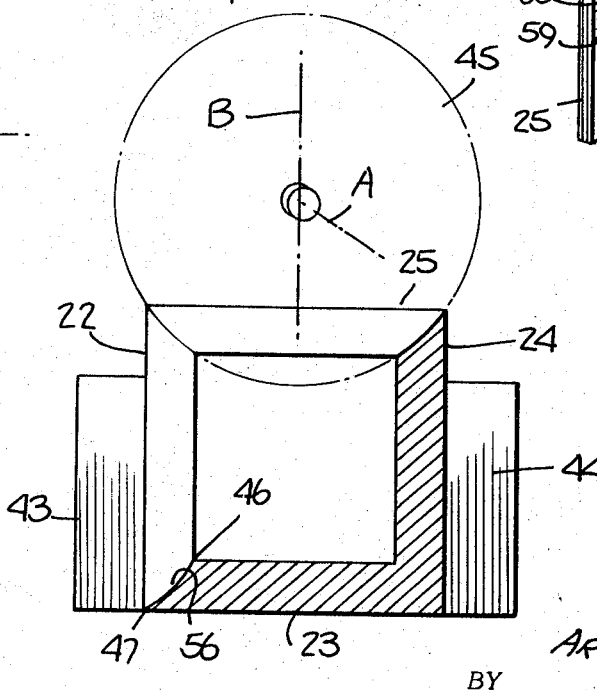

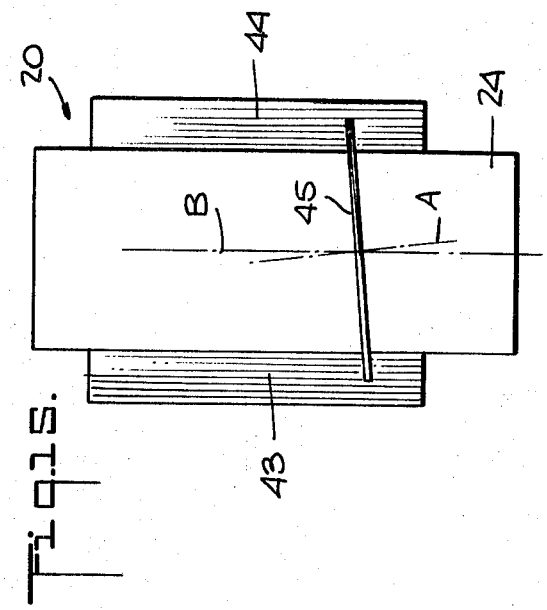
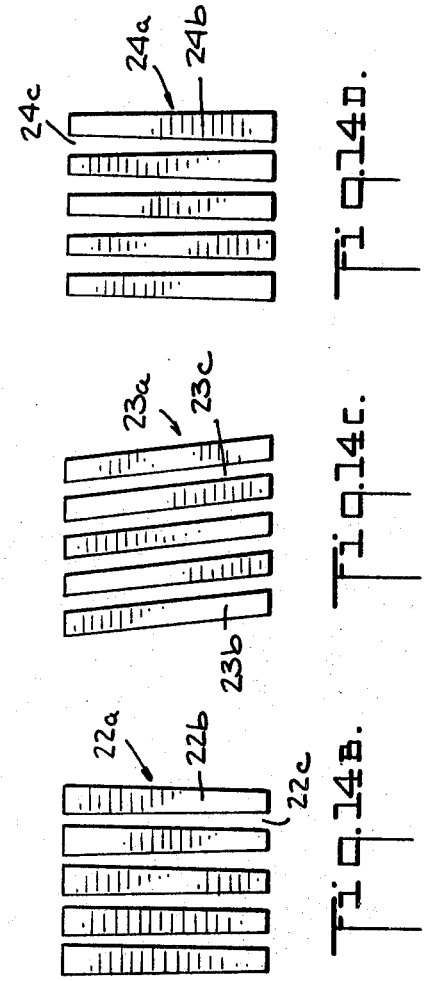
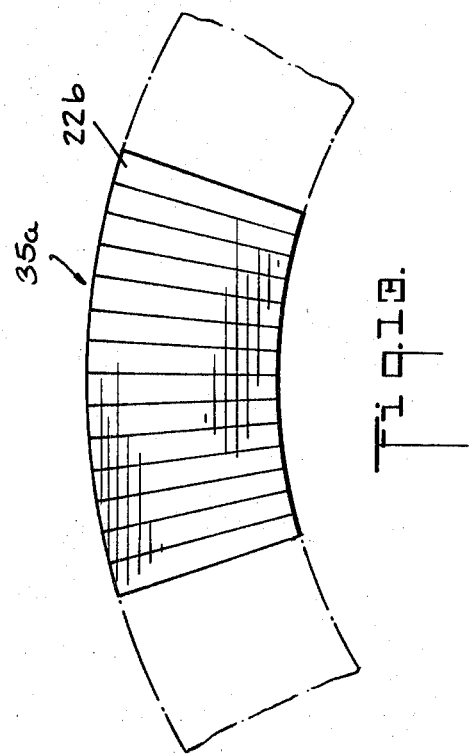
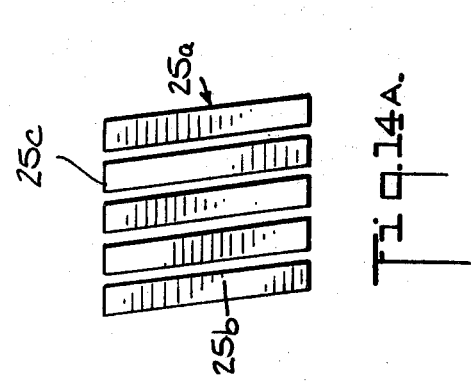

INVENTOR.
ARIEL R. DAVIS
BY
George C. Barver
ATTORNEY

METHOD OF MANUFACTURE

This application is a division of application Ser. No. 784,979, now abandoned.

BACKGROUND OF THE INVENTION

The usual method of forming inductive windings is to wrap cylindrical copper wire around a core. Inductive windings have also been formed by interleaving sheet metal strips with insulating pieces to form an inductive winding or bending continuous metal ribbon into inductive turns. The standard cylindrical wire type of winding has problems of heat dissipation through the layers of turns and corrosion and pitting of the wire on engagement by a variable voltage tap. The stacked laminations of sheet metal and insulating pieces requires the transfer of current between engaging surfaces of the laminations. The distortion of an edge bent metal ribbon to form an inductive winding is not satisfactory. All of the foregoing forms have an additional disadvantage of transference of load current across connections. Such connections are a source of maintenance problems.

SUMMARY OF THE INVENTION

An inductive winding is formed from a tubular member by cutting around the wall of the tubular member to form continuous turns of a winding with terminal portions at each end so that current is passed from the terminal portions through the windings without transferring between two engaging surfaces.

An object of the invention is to provide a single piece inductive winding that has flat side surfaces between and on the turns.

Another object of the invention is to provide an inductive winding with terminal portions that are formed with the inductive winding as a single piece.

Another object of the invention is to provide an inductive winding that passes current without transfer between surfaces and conducts heat through the side surfaces of the winding.

Another object of the invention is to provide an inductive winding and a heat sink as a single piece of metal.

Another object of the invention is to provide as a single piece an inductive winding and a component supporting member in electrical conductive relation with the winding and support member.

Other and further objects and advantages will be apparent from the following description taken in connection with the drawings.

BRIEF DESCRIPTION OF THE DRAWINGS

FIG. 1 perspectively illustrates an uncut tubular member with exterior smooth surfaces.

FIG. 2 perspectively illustrates an uncut tubular member with exterior fins on three surfaces.

FIG. 3 perspectively illustrates the exterior smooth surface tubular member with winding cut therein.

FIG. 4 perspectively illustrates a finned tubular member with the fins removed from a section and a winding formed therein.

FIG. 5 perspectively illustrates a finned tubular member with the winding section having fins.

FIG. 6 illustrates the smooth side of the finned tubular member with notches for passing an iron core member.

FIG. 7 is a view of one of the sides illustrating cuts forming the winding.

FIG. 8 illustrates a surface adjacent to the surface shown in FIG. 7.

FIG. 9 illustrates the turns of the winding spaced.

FIG. 10 is a fragmentary perspective view of the turns of the winding.

FIGS. 11 and 12 illustrate the cutting of the wall of the tubular member by a circular saw.

FIG. 13 fragmentarily illustrates a toroidal winding.

FIGS. 14a through d diagrammatically illustrate the fragments of the sides of the uncompressed toroidal winding.

FIG. 15 is a diagrammatic view illustrating the relationship of the tubular member and the circular saw.

DETAILED DESCRIPTION

Figure 16:
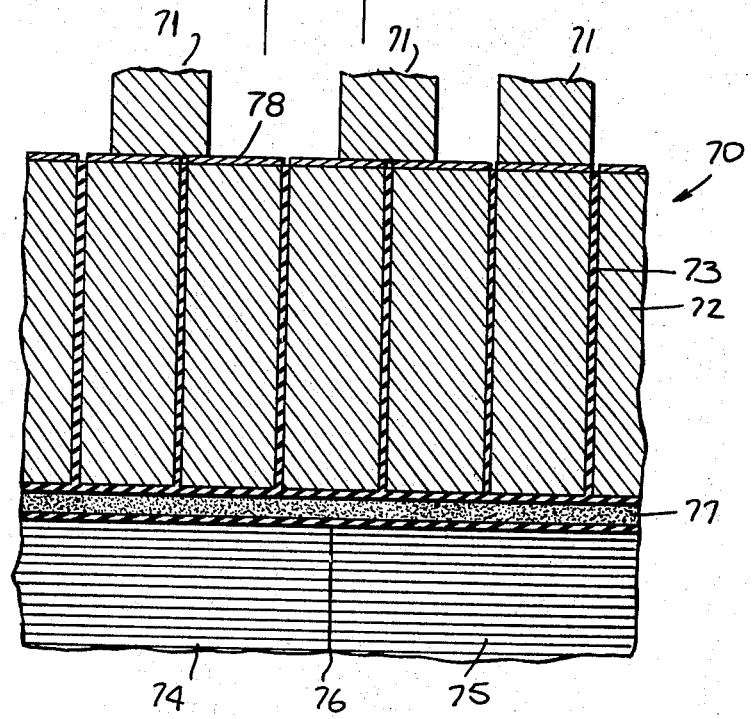
FIG. 16 is a fragmentary sectional view of a winding with a plurality of variable contacts.

Referring to FIG. 1 of the drawings, a tubular member 20 is illustrated having a bore 21 extending longitudinally therethrough and of a generally square configuration formed by walls 22, 23, 24, 25. The tubular member may be made of aluminum and extruded through a die with a floating mandrel using a hollow aluminum billet. The aluminum may be 6063 or EC grade with a T6 temper for best machining qualities. The tubular member is cut in any desired length from the extrusion. The exterior surfaces of the walls may be smooth or, as illustrated in FIG. 2, have cooling fins 26, 27, 28 extending longitudinal to the member and perpendicular to the walls 22, 23, 25. The exterior surface of wall 24 is smooth. The walls of the tubular member are cut as described later herein to form a winding 35 with terminal portions 36, 37 at each end as illustrated in FIG. 3.

The fins may be removed (FIG. 4) from a portion of the member to form a winding section 30 with flat sides 22 to 25 and a heat sink section 31 with cooling fins 26, 27, 28. The winding section 30 with the flat sides may be cut in accordance with the method of this invention to form an inductive winding 32 while the heat sink section 31 supports electrical components (not shown). In the embodiment of FIG. 5 the winding 38 is cut in the finned embodiment of FIG. 2 without removing the fins from the winding section, so that the winding 38 has fins 26, 27, 28.

The tubular member 20 or winding section 30 has longitudinal cuts 40, 41 in the smooth exter wall 24 (FIG. 7) immediately adjacent to the opposite walls for forming notches 50, 51 in the side for subsequently receiving an iron core. A longitudinally extending bore 42 may be cut in one of the walls for receiving a terminal prong 39 threaded therein.

The winding or coil 35 is cut in the tubular member 20 by fitting the tubular member in a vise or clamping members 43, 44 (FIGS. 11 and 12) and moving a circular rotating saw 45 downwardly through the upper side 22 of the tubular member. The circular saw 45 (FIGS. 11, 12) is perpendicular to the side 22 to be cut and centered in relation to the sides 23 and 25. The axis A (FIG. 15) of the saw is at a slight angle to plane B extending longitudinally midway between the sides 23, 25 and perpendicular to the side 24. The center point of the saw is in this plane B. The saw has a diameter so that the periphery of the saw cuts each of the inner and outer corners 46, 47, 48, 49 of a side at the same time. This is best illustrated by the curved line 56 between corners 46, 47 (FIG. 12). The member is then removed from the vise or clamping members and rotated 90° to present side 23 for cutting (FIG. 11). The plane B extends longitudinally midway between the sides 22, 24 and perpendicular to side 25. The axis A of the saw is at a slight angle with the centerpoint of the saw in the plane. The tubular member is positioned so that on completion of the cut in this side the saw is in line with the portion of the previous cut 50 inside 22. The cut 50 is continuous through successive sides. Instead of a single saw being used, multiple saws may make all cuts in one wall of the tubular member at the same time. Thus by four successive positions of the tubular member the entire winding can be formed. The first and last cuts on the wall 24 intersect the longitudinal slots 40, 41 to form the slots 51, 52 for the iron core.

As seen from the fragmentary views of the winding in FIGS. 9 and 10 the successive angular cuts in the walls 22, 23, 24 and 25 produce a rectangular shaped winding with a continuous space 50 between the turns. The winding in this form is resilient and may be compressed so that the side surfaces 53 and 54 in the wall 22, side surfaces 55, 56 in the wall 23, side surfaces 57, 58 in the wall 24 and side surfaces 59, 60 in the wall 25 are in engagement. A thin insulating coating, later described herein, is provided on these sides to isolate the turns and form the winding into an inductive winding. Thus the side surfaces may be compressed in a close contiguity for transfer of heat therebetween.

The tubular member 20 with the winding 35 and the terminal portions 36, 37 may be heat treated and annealed to a soft temper to increase the conductivity of the metal. The tubular member can then be further treated to form an insulating coating on the surface of the tubular member and particularly the facing sides 53, 54 of the winding. Also, the facing sides 55, 56; 57, 58 and 59, 60 require an insulating coating. The fins are also treated. The coating also improves the radiation properties of the tubular member and various colors may be provided depending upon the desired appearance. The anodized coating on the side walls of the winding permits the winding to be pressed together without shorting the windings while permitting substantial heat flow between the surfaces to provide a short heat path for removal of the heat from the windings.

An insulating coating may also be provided by covering the tubular member with an epoxy cement containing glass spheres of 0.004 in. to 0.005 in. in diameter. The insulating glass spheres maintain a minimum spacing between the windings so that the side surfaces of the windings have a layer of epoxy therebetween. The glass spheres act as spacers when the coils of the winding are forced together and prevent the extrusion of the epoxy and a metal to metal contact between the windings. Thus an adequate insulating is provided between the turns.

Additional coating may be provided on the exterior surfaces of the tubular member and fins by spraying an epoxy on the surface or by heating the tubular member and placing it into a bed of epoxy powder. This may be done on an anodized tubular member and an unanodized tubular member.

In the coating process masks may be applied to the metal surfaces at desired areas where electrical contact with the metal is desired.

Figure 17:
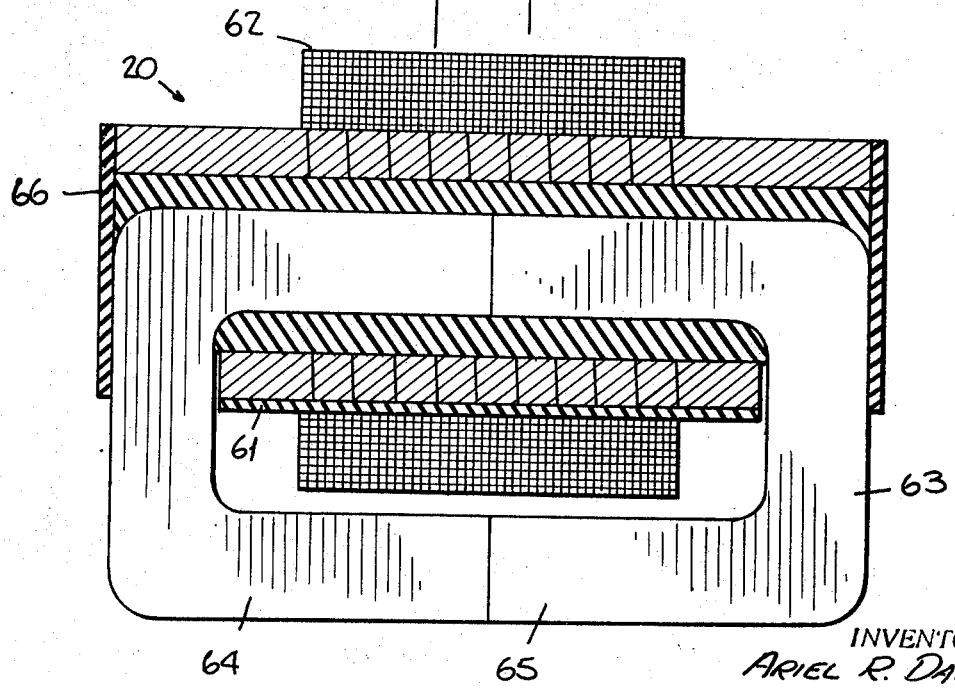
FIG. 17 illustrates a transformer with a winding in accordance with the invention.

The winding may be held in a compressed condition by an insulating plate 61 being positioned along one of the sides of the tubular member 20 or winding sections 30 or winding 38 and fastened to the terminal portions at each end. The insulating plate 61 has matching notches. The tubular member with the winding may be used in various embodiments. For example, a primary winding may be used in various embodiments. For example, a primary winding 62 (FIG. 17) may be positioned around the outside of the tubular member and an iron core 63 fitted in the bore. The iron core may be made of U-shaped silicon steel straps or be made of a tape wound core cut into U shapes or may be powdered iron or powdered ferrite moulded into U shapes. The U shapes each have a leg inserted into the bore 21. The ends of the bore may be closed by plates 66 and the bore filled with rubber, flexible urethane, flexible rubber, silicon rubber or the like and solidified by a catalyst or heating to support the iron core and electrically isolate it from the winding. The elastomer assists in absorbing noise that may be caused by vibrations of the iron core. The winding sections 30 and 38 also have an insulating plate 61 and an iron core 63.

The legs of the two U-shaped pieces 64, 65 may be in contact or may be spaced, depending upon the characteristics to be imparted to the assembled unit. A mica spacer 67 may be positioned between the ends of the legs. Cores with a small air gap may be used to provide linear reactors. The gap between the cores can be adjusted depending upon the linearity of saturation of the core that is desired. This will depend upon the use of the device. The tubular member with the winding is particularly useful where high load currents are passed by the winding. Such load currents occur in chokes used in series with solid state controlled devices, in rectifier power supplies, in adjustable autotransformers, dimmer and magnetic amplifiers, linear reactors and the like.

For solid state controlled devices the tubular member with heat sink 31 (FIG. 4) is used. The solid state controlled devices are mounted in the heat sinks. Thus the heavy currents passed by the solid state controlled devices are conducting through the terminal portions, winding, into the heat sink with the current passing only through the surfaces between surfaces of the heat sink and solid state controlled devices. This greatly reduces the factors that create heat and also provides a ready dissipation of any heat created by the same element that is carrying the heat.

In FIG. 16 a fragmentary sectional view of an adjustable autotransformer 70 having a plurality of variable contacts 71 engaging the turns of the winding 72 is shown. The winding has an insulating coating 73 of anodized aluminum or epoxy resin. The U-shaped members 74, 75 of the iron core choke are in engagement at 76 and potted in silicon rubber 77. The turns of the aluminum winding 72 have a conductive resistive coating 78, such as Nichrome. The brushes 71 engage these coatings and provide a resistance to circulating currents through bridged windings and a contact 71. The contact 71 may be made of any suitable material, such as carbon.

The tubular member with the winding and terminal portions, including the embodiments with the heat sinks and fins, may be utilized in many different types of apparatus of which the foregoing are only illustrative.

In FIGS. 13 and 14 a toroidal winding 35a is fragmentarily illustrated and embodies the principles of the invention. The tubular member 20a has walls 22a to 25a. The walls 22a and 24a are cut as shown in FIGS. 14b and d. The walls 22a and 24a have pie or V-shaped cuts 22c and 24c between the winding segments 22b and 24b, respectively. The cuts may be made by positioning the axis of the saw shaft at an angle A on one side of plane B and then at an angle A on the other side of plane B. The pie shaped cuts in the wall 24a are similarly formed with the narrow portions at the wall 23a. The wall 23a has the narrow segments 23b and the wall 25a has the broad segments 25b formed by the cuts 23c and 25c at an angle C to the plane B. The winding compresses into a circular configuration as partially illustrated in FIG. 13. The tapered segments 22b and 24b are normal to the sides 23a and 25a on cutting and assume a radial position on compression. The general spiral configuration to form an inductive winding is attained by the slope of the segments 23b and 25b. As illustrated in FIGS. 14a and 14b the angle C is greater than angle A. The segments are arranged in FIGS. 14a and b with contacting ends adjacent in the figures to illustrate the progression of the winding. The surface of the winding may be treated as in the other embodiments to provide an insulating coating by anodization or polymerization of a resin. The surfaces 22a may be provided with a surface similar to the embodiment of FIG. 16 for engagement by movable contact means to tap a range of voltages and currents.

It is thus seen from the foregoing description that a new type of inductive winding and method of manufacture of an inductive winding have been provided. The winding may be formed by machinery and may be automated. The tubular member is readily extruded and the winding cut to precise dimensions rapidly by multiple circular saws. The insulating surfaces on the winding may be readily produced by standard anodyzing processes.

The winding has the particular feature that the winding and terminal portions are a single piece without any current transferring surfaces or connections. Also, the individual turns are flat rectangular pieces with considerable depth normal to the exterior surfaces of the winding and with extended transverse facing surfaces for the transference of heat longitudinally along the winding. This is particularly advantageous when variable contacts engage the outer surfaces of the windings for tapping various voltages or currents therefrom. Heat produced between the contact and the winding is carried inwardly and longitudinally for dissipation, thus reducing or preventing the pitting or corrosion of the engaging surfaces. Further, the winding may be readily provided with cooling fins and may be formed as a single piece with a heat sink for dissipation of heat developed in the winding. Further, the heat sink may be used to support other heat generating electrical components which will be in electrical conductive relation with the winding by a transference of current through a single contacting surface. Thus the amount of heat generated is greatly reduced and the heat that is generated may be readily dissipated. Therefore, an inductive winding with heat dissipating means may be readily manufactured by machine methods which has good heat dissipating and current transferring characteristics.

Various modifications and changes may be made in the various embodiments without departing from the invention as set forth in the appended claims.

I claim:

1. A method of manufacturing an inductive winding from a generally rectangular, tubular, electrically conductive member having longitudinally extending walls with longitudinally extending inner and outer surfaces and longitudinally extending inner and outer corners joining longitudinally adjacent inner and outer surfaces comprising
cutting through each wall from the respective outer surface to the respective inner surface and to the respective corners to form serially connecting generally spiral-like turns in inductive relation.

2. A method of manufacture as set forth in claim 1 wherein an insulation is provided between said turns.

3. A method of manufacture as set forth in claim 1 wherein said step of cutting is a slight angle to the normal of the longitudinal axis.

4. A method manufacture as set forth in claim 1 wherein the step of cutting a wall is by circular saw means.

5. A method of manufacture as set forth in claim 1 wherein the step of cutting is from the longitudinal center area of an outer surface of a wall to the longitudinal center area of the respective inner surface and the center areas to each of the respective inner and outer corners along the wall being cut.

6. A method of manufacture as set forth in claim 1 wherein the step of cutting of a wall is by a plurality of circular saws rotating about an axis at a slight angle to the longitudinal axis of the winding and simultaneously cutting a given wall.

7. A method manufacture as set forth in claim 1 wherein the step of cutting is through successive walls.

8. A method of manufacture as set forth in claim 1 wherein the step of cutting is by a circular saw having a radius to intersect the inner and outer corners and rotating about an axis at a slight angle to the longitudinal axis of said member.

9. A method of manufacture as set forth in claim 8 wherein in the step of cutting the inner and outer corners are intersected simultaneously.

10. A method of manufacture as set forth in claim 1 wherein the step of cutting is the successive cutting of the walls by a plurality of parallel and simultaneous cuts at a slight angle to the normal of the longitudinal axis of the tubular member and each cut simultaneously intersecting the inner and outer corners.

* * * * *